(12) United States Patent
Bauer et al.

(10) Patent No.: US 10,674,720 B2
(45) Date of Patent: Jun. 9, 2020

(54) APPARATUS FOR CRYOPRESERVING A PLURALITY OF CELLULAR SAMPLES AND METHOD FOR CRYOPRESERVING A PLURALITY OF CELLULAR SAMPLES

(71) Applicant: HOFFMANN-LA ROCHE INC., Little Falls, NJ (US)

(72) Inventors: Rüdiger Bauer, München (DE);
Markus Hammel, Penzberg (DE);
Sandra Loeder, München (DE);
Robert Pienkny, Penzberg (DE); Clara Von Ledebur-Wicheln, München (DE);
Steffen Wehner, Erlangen (DE)

(73) Assignee: HOFFMAN-LA ROCHE, INC., Little Falls, NJ (US)

( * ) Notice: Subject to any disclaimer, the term of this patent is extended or adjusted under 35 U.S.C. 154(b) by 111 days.

(21) Appl. No.: 16/077,220

(22) PCT Filed: Feb. 10, 2017

(86) PCT No.: PCT/EP2017/052987
§ 371 (c)(1),
(2) Date: Aug. 10, 2018

(87) PCT Pub. No.: WO2017/137552
PCT Pub. Date: Aug. 17, 2017

(65) Prior Publication Data
US 2019/0029247 A1 Jan. 31, 2019

(30) Foreign Application Priority Data
Feb. 12, 2016 (EP) .................................... 16155424

(51) Int. Cl.
*A01N 1/02* (2006.01)

(52) U.S. Cl.
CPC ......... *A01N 1/0221* (2013.01); *A01N 1/0247* (2013.01); *A01N 1/0252* (2013.01);
(Continued)

(58) Field of Classification Search
CPC .. A01N 1/0221; A01N 1/0247; A01N 1/0252; A01N 1/0257; A01N 1/0268; A01N 1/0284
See application file for complete search history.

(56) References Cited

U.S. PATENT DOCUMENTS 4,580,409 A 4/1986 Angelier et al.
2006/0283197 A1 12/2006 Schon et al.
(Continued)

FOREIGN PATENT DOCUMENTS

WO WO 2005/036136 A 4/2005
WO WO 2008/047154 A2 4/2008

OTHER PUBLICATIONS

Fowler, A. et al., Cryo-Injury and Biopreservation, Ann. N. Y. Sci. 1066 (2005) 119-135.
(Continued)

*Primary Examiner* — Marc E Norman
(74) *Attorney, Agent, or Firm* — Alston & Bird LLP

(57) ABSTRACT

An apparatus and a method for cryopreserving a plurality of cellular samples are disclosed. The apparatus may include a cooling chamber and a cooling device that may include a mechanism to cool an interior of the cooling chamber. The cooling device may further include cooling tubes that are separate from the mechanism to cool the interior of the cooling chamber and that are arranged within the cooling chamber. The cooling device may provide a flow of refrigerant through the cooling tubes and a support for supporting a plurality of vials for storing cellular samples. The support (Continued)

may be movable relative to the cooling tubes such that the plurality of vials may be engageable with the cooling tubes.

19 Claims, 4 Drawing Sheets

(52) U.S. Cl.
CPC ......... *A01N 1/0257* (2013.01); *A01N 1/0268* (2013.01); *A01N 1/0284* (2013.01)

(56) References Cited

U.S. PATENT DOCUMENTS

| | | | |
|---|---|---|---|
| 2010/0028214 A1* | 2/2010 | Howard | ............... A01N 1/0252 422/400 |
| 2012/0102982 A1* | 5/2012 | Zhou | ................... A01N 1/0257 62/62 |
| 2013/0111931 A1 | 5/2013 | Grinter et al. | |

OTHER PUBLICATIONS

Masur, P., Freezing of Living Cells: Mechanisms and Implications, Am. J. Physiol. 247 (1984) C124-C142.

Morris, G. J. et al., Controlled Ice Nucleation in Cryopreservation—A Review, Cryobiology 66 (2013) 85-92.

Seth, C., Freezing Mammalian Cells for Production of Biopharmaceuticals, Methods 56, (2012) 424-431.

Wilson, P. W., Ice Nucleation in Nature; Supercooling Point (SCP) Measurements and the Role of Heterogeneous Nucleating, Cryobiology 46 (2003) 88-98.

International Search Report and Written Opinion for Application No. PCT/EP2017/052987 dated May 17, 2017, 9 pages.

\* cited by examiner

APPARATUS FOR CRYOPRESERVING A PLURALITY OF CELLULAR SAMPLES AND METHOD FOR CRYOPRESERVING A PLURALITY OF CELLULAR SAMPLES

CROSS-REFERENCE TO RELATED APPLICATIONS

This application is a national stage application filed under 35 U.S.C. § 371 of International Application No. PCT/EP2017/052987 filed Feb. 10, 2017, which claims priority to EP Application No. 16155424.1 filed Feb. 12, 2016, which applications are hereby incorporated by reference in their entireties.

FIELD OF THE INVENTION

The present invention relates to an apparatus and a method for cryopreserving a plurality of cellular samples. The terms "cryopreservation" and "cryopreserving", respectively, as used herein refers to a process of preserving cellular samples by cooling to and storing at ultra low temperatures below approximately −130° C. The term "cellular sample" as used herein refers to eukaryotic cells. Usually, the process of cooling and freezing is carried out by means of a refrigerant such as liquid nitrogen.

RELATED ART

The successful cryopreservation of cells is an important prerequisite for the production of biopharmaceuticals (Seth, G.: *Freezing mammalian cells for production of biopharmaceuticals; Methods* 56, p. 424-431, 2012). However, cryopreservation of cellular samples is still a challenge in order to avoid a deterioration of the quality of the cells.

When cell containing suspensions are cooled, the suspension will not necessarily crystallize when the freezing point of the cellular solution is reached. Rather, the suspension will be super-cooled. Super-cooling is defined as a lowering of the temperature of a liquid below its freezing point without the liquid freezing or solidifying (Wilson, P. W: *Ice Nucleation in nature: supercooling point (SCP) measurements and the role of heterogeneous nucleation. Cryobiology* 46, p. 88-98, 2003). The formation of the first ice crystal, called "seeding", in the super-cooled solution occurs either spontaneously over a range of temperatures or by means of selective induction, e.g. by a cold pulse or mechanically by rocking at a specific temperature (Mazur, Peter: *Freezing of living cells: mechanisms and implications. Am. J. Physiol.* 247. C125-C142. 1984). When freezing multiple cellular samples, an induction of seeding is desirable to avoid extensive super-cooling and allow simultaneous crystallization of all samples (Morris, G. J. & Acton, E.: *Controlled ice nucleation in cryopreservation—a review. Cryobiology* 66, p. 85-92, 2013).

Due to the phase change from liquid to solid during seeding, crystallization enthalpy ("latent heat") is set free which causes a temperature rise in the sub-cooled medium up to the freezing point. If ice crystals are formed in concentrated solutions, the solved substances are not incorporated into the ice but accumulate in the fluid between the ice crystals and, thus, may increase the concentration of the solution. The cell components do not freeze and become super-cooled. The subsequent processes depend on the cooling rate. If the cooling rate is sufficiently low, the cells lose water due to exosmosis such that the intracellular substances as saccharides and salts concentrate. Thus, super-cooling within the cells is prevented. Further, the chemical potential of the intracellular water remains in equilibrium with the chemical potential of the extracellular water. As a result, the cells dehydrate without intracellular freezing (Mazur, Peter: *Freezing of living cells: mechanisms and implications. Am. J. Physiol.* 247. C125-C142. 1984).

However, if the cooling rate is too low, solution effects and osmosis can damage cells (Fowler, A. & Toner, M.: *Cryo-injury and biopreservation. Ann. N. Y. Acad. Sci.* 1066, p. 119-135, 2005). In contrast, if the cooling rate is high, the cells may not dehydrate fast enough in order to achieve the equilibrium. Thus, the intracellular liquid is gradually super-cooled until the phase change from liquid to solid takes place and ice is formed within the cells (Mazur, Peter: *Freezing of living cells: mechanisms and implications. Am. J. Physiol.* 247. C125-C142. 1984).

In summary, viability of cells after re-vitalization is dependent on several factors. Of high importance are the seeding step and the cooling rate. Cells, which are cooled too fast, are destroyed due to the formation of intracellular ice and re-crystallization effects when being re-vitalized. Cells, which are cooled too slowly, are exposed to solution effects and osmotic damage.

Accordingly, apparatuses for cryopreserving cellular samples have to be constructed in a way to guarantee exact, simultaneous and reproducible seeding and subsequent cooling to avoid cooling rates that are too low or too high.

Conventional apparatuses do not sufficiently fulfil this challenge as these may not cryo-preserve a large number of cellular samples under homogenous conditions. Particularly, the temperature distribution between the single cellular samples stored in vials is inhomogeneous during freezing as the vials are arranged spatially one after another. This is due to the cubic shape of the cooling chamber which causes turbulences, stalls and uneven distribution of the injected refrigerant. These effects cause an inhomogeneous heat removal depending on the vial position. Thus, the temperature within the cellular samples may not be exactly controlled, which is particularly relevant for inducing the ice crystallization. Therefore, there are significant differences in the cooling rates between the respective vials and deviations from the target temperature distribution. Further, in many conventional freezing devices, the seeding function for inducing the ice crystallization is not suitable to synchronously induce the ice crystallization as the refrigerant does not come into contact with each vial. Thus, the formation of ice crystals occurs spontaneously and not controlled. Further, the removal of the latent heat is difficult or problematic as the latent heat may not be removed efficiently. Accordingly, the degree of the sub-cooling process up to the formation of ice crystals within the vials and the further process vary from each other. In consequence, inhomogeneous conditions result in high variance in respect to product quality within a cell bank and between different cell banks.

SUMMARY

Disclosed herein are an apparatus and a method for cryopreserving a plurality of cellular samples allowing a freezing of vials in a simultaneous and reproducible manner.

Embodiments of the disclosed apparatus and a method for cryopreserving a plurality of cellular samples have the features of the independent claims. Particular embodiments, which might be realized in an isolated fashion or in any arbitrary combination, are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

According to the disclosed apparatus for cryopreserving a plurality of cellular samples, the apparatus comprises a cooling chamber, a cooling device comprising means configured to cool an interior of the cooling chamber, wherein the cooling device further comprises cooling tubes that are separate from the means configured to cool the interior of the cooling chamber and that are arranged within the cooling chamber, wherein the cooling device is configured to provide a flow of refrigerant through the cooling tubes, and a support for supporting a plurality of vials for storing cellular samples, wherein the support is movable relative to the cooling tubes such that the plurality of vials is engageable with the cooling tubes.

The term "cooling tubes" as used herein refers to tubes or pipes through which a refrigerant may flow. Particularly, the cooling tubes are part of a so called closed cooling system such that the refrigerant is not supplied into the cooling chamber by means of the cooling tubes, i.e. the cooling tubes do not comprise openings or orifices in communication with the cooling chamber. The cooling chamber and the interior thereof may be separately cooled by means of the cooling device as will explained in more detail below.

According to the apparatus, the support may receive a plurality of vials or may be loaded with a plurality of vials. The support may be moved so as to bring the plurality of vials in contact with the cooling tubes when being loaded with vials. Thus, the vials may be engaged by the cooling tubes at a target point of time and/or at a target temperature. With other words, the support is movable relative to the cooling tubes to an extent or in a manner to a position allowing the plurality of vials to be engaged by the cooling tubes. Accordingly, it is possible to initiate or induce a crystallization process within the vials by the engagement of the vials with the cooling tubes. Particularly, crystallization of the cellular samples may be locally induced and not completely across an outer surface of the cellular sample.

The support may be movable such that the plurality of vials is engageable with the cooling tubes at a predetermined and adjustable height of the vials. The support may be adjusted to change the height of the engagement point at the vial. The height may correspond to a liquid surface of the cellular samples or any other desired point at the vial. The term "height of a vial" as used herein refers to a certain position at the vial in a longitudinal direction along which a vial usually extends. Particularly, the height is determined as a position in a direction from the bottom to the top of the vial. The position of contact at the predetermined height may thus be determined by the position of the liquid level of the cellular sample within the vial. Thus, too much radiation of the coldness into the vials is prevented. Further, the cooling impulse may be locally limited. Particularly, the heterogeneous temperature distribution resulting from the cooling impulse may only occur in a local limited manner and should extend within the vials as small as technically possible.

The cooling tubes may be arranged parallel to one another. Thus, an even distribution of the cooling tubes is provided. This is particularly achieved if the cooling tubes are evenly spaced apart from one another.

The support may comprise a plurality of compartments for receiving the plurality of vials. The compartments may be arranged such that the plurality of vials is arrangeable between the cooling tubes. For example, the compartments are arranged as lines, which extend parallel to one another.

Advantageously, the cooling tubes and the compartments are arranged parallel to one another. Thus, the distance of the compartments to the cooling tubes and by which the support has to be moved for engaging the vials with the cooling tubes is identical for each vial.

The compartments may be movable relative to the support. Thus, a kind of fine tuning regarding the positioning of the vials relative to the cooling tubes is provided which allows each vial to be individually engaged with a cooling tube in an identical manner. This may be realized if the compartments are movable in the support, for example.

The compartments may be adapted to fix the plurality of vials. Thus, the vials are securely received by the compartments.

The compartments may be formed such that the plurality of vials may be directly engageable with the cooling tubes. Thus, the coldness of the cooling tubes may be directly introduced in the vials without any constructional member inbetween.

The support may be movable on rails. Thus, a rather simple construction may be used for moving the support.

The cooling device may be adapted to provide a sufficient flow of refrigerant through the cooling tubes such that the cooling tubes reach a cooling tube outer surface seeding temperature within a precooling time. The term "precooling time" as used herein refers to a time which is relatively defined with respect to a time, in which the cooling chamber may be cooled to the seeding temperature. Particularly, the precooling time is shorter than the time within which the cooling chamber may be cooled to the seeding temperature. With other words, the cooling tubes reach the cooling tube outer surface seeding temperature within the precooling time and before the seeding temperature of the cooling chamber is reached. Thus, it is ensured that the seeding process may be initiated within a desired time for maintaining the quality of the cellular samples.

The cooling device may comprise a ring-shaped tube portion. The cooling tubes may be connected to the ring-shaped tube portion. Thus, a sufficient supply of the refrigerant into the cooling tubes is provided for reaching the cooling tube outer surface seeding temperature in the precooling time. The term "cooling tube outer surface seeding temperature" as used herein refers to a temperature defined at the outer surface of the cooling tubes which is suitable to induce a seeding process of the cellular samples. With other words, the temperature of the cooling tubes at the outer surface thereof must be sufficient low in order to allow inducing a seeding process of the cellular samples when the vials engage the cooling tubes. The temperature at the outer surface of the cooling tubes may be detected by means of a temperature sensor arranged at the outer surface of the cooling tubes.

The ring-shaped tube portion surrounds the cooling tubes. The cooling tubes may comprise ends connected with the ring-shaped tube portion. Thus, each cooling tube may be supplied with refrigerant from the ring-shaped tube portion for reaching the cooling tube outer surface seeding temperature in the precooling time.

The ring-shaped tube portion may comprise inlets for supplying refrigerant. Thus, the refrigerant may be supplied at several locations to the ring-shaped tube portion which serves to better distribute the refrigerant to the ring-shaped tube portion.

The ring-shaped tube portion may be separated into segments, wherein each segment is associated with at least one of the inlets. Thus, each segment may be supplied with refrigerant.

The ring-shaped tube portion may be separated into the segments by means of separating walls. Thus, each segment is independent from another segment and may be individually supplied with refrigerant.

The inlets may be evenly spaced apart from one another. Thus, a sufficient supply with refrigerant is provided. This also causes a sufficient flow of the refrigerant through the cooling tubes for reaching the cooling tube outer surface seeding temperature in the precooling time.

An inner diameter of the ring-shaped tube portion may be larger than an inner diameter of the cooling tubes. Thus, it is ensured that a sufficient amount of refrigerant may be supplied to the cooling tubes from the ring-shaped tube portion.

The cooling device may be adapted to provide refrigerant flow from bottom to top of the cooling tubes until reaching cooling tube outer surface seeding temperature within the precooling time. The terms "bottom" and "top" as used herein refer to orientations relative to the cooling chamber. As the cooling chamber is basically oriented in a vertical direction and the direction of gravity, respectively, the refrigerant is supplied into the cooling tubes at a lower side of the cooling tubes or at a position below the cooling tubes and is discharged from the cooling tubes at a top side of the cooling tubes or at a position above the cooling tubes even though the cooling tubes may be arranged in a horizontal direction and a direction perpendicular to the direction of gravity, respectively. Thus, after the refrigerant has been used and comprises a higher temperature and/or a phase change from liquid to gas, the refrigerant may be withdrawn from the cooling tubes using the conventional convection effects. Thereby, the accumulation of gaseous refrigerant within the cooling tubes is prevented.

The cooling chamber may be cylindrical. Thus, a symmetric arrangement is provided which improves temperature laminar, plug-flow of refrigerant within the cooling chamber.

The apparatus may further comprise an inner casing, in which the cooling chamber is located, and an outer casing housing the inner casing. Thus, the cooling chamber may be thermally isolated.

The means configured to cool an interior of the cooling chamber may be or may comprise nozzles for injecting a refrigerant for cooling the interior of the cooling chamber. Thus, the refrigerant may be distributed within the cooling chamber for homogenously lowering the temperature.

The nozzles may be disposed in a space between the inner casing and the outer casing. Thus, the nozzles may be arranged in a compact manner.

The inner casing may comprise a lower side and a top side, wherein the lower side and the top side may comprise orifices. For example, the lower side and the top side may comprise perforated plates, wherein the perforated plates comprise the orifices. The perforation plates may comprise a perforation ratio of 5% to 15%. The perforation ratio may vary over the plate radius. With other words, the perforation ratio of a radial outer portion of the perforated plates may be different from a radial middle portion and/or a radial inner portion. Further, the perforation ratio of the perforated plate at the lower side may be different from the perforation ratio of the perforated plate at the top side. The term "perforation ratio" as used herein refers to the ratio of the cross-sectional area or opening area of the orifices to or in relation to the surface area of the perforation plate in which the orifices are formed. Thus, the refrigerant may be evenly distributed. Particularly, the perforated plates cause a stow or jam of the refrigerant and a homogenous and laminar flow of the refrigerant in the space between the inner casing and the outer casing.

The apparatus may further comprise a fan disposed between the top side of the inner casing and the outer casing. Thus, a refrigerant flow can be generated.

The cooling device may comprise an inlet, which is located in the space between the inner casing and the outer casing, and distribution tubes connecting the inlet to the nozzles. Thus, the refrigerant may be distributed throughout the cross section of the cooling chamber. This is particularly achieved by an even distribution of the nozzles in the space between the inner casing and the outer casing.

The nozzles may be located within a common plane. Thus, the nozzles comprise a predetermined identical distance to the support.

The inlet may be located on a central axis of the cooling chamber. Thus, identical flows of the refrigerant from the inlet to the nozzles are provided.

The inlet and the distribution tubes may be located with a minimum of contact area between the distribution tubes and the flow in inner and outer casing. Thus, the distribution tubes of inlet generate a minimum of convective cooling of the flow along the tubes. Only the outcoming refrigerant cools the flow.

The apparatus may further comprise a middle casing arranged between the inner casing and the outer casing. The middle casing may comprise an outlet for refrigerant. The outer casing may comprise an outlet for refrigerant. The outlet of the middle casing and the outlet of the outer casing are connected to one another. Thus, a predetermined flow of refrigerant is provided.

The middle casing may comprise a lower side and a top side. The outlet of the middle casing may be located in the lower side, wherein the outer casing may comprise a lower side and a top side, wherein the outlet of the outer casing may be located in the top side. Thus, a flow of the used refrigerant from a bottom to a top of the casings is provided.

The support may be adapted to support the plurality of vials in a common plane. Thus, the laminar plug-flow of refrigerant removes equal heat equivalents at each vial.

The cooling device may be adapted to supply the cooling tubes with refrigerant in a liquid state such that a seeding process of the cellular samples in the vials is initiated by means of an engagement of the vials with the cooling tubes. Thus, the cellular samples may be frozen under defined conditions.

According to the disclosed method for cryopreserving a plurality of cellular samples, an apparatus as described above is used. The method comprises the steps:
  cooling the cooling chamber to a temperature hold point,
  providing cellular samples in a liquid state in a plurality of vials,
  loading the support with the plurality of vials,
  holding the cooling chamber at the temperature hold point for purpose of temperature synchronization in the plurality of vials,
  cooling the cooling chamber to a seeding temperature in the vials,
  supplying a refrigerant through the cooling tubes for a precooling time such that the cooling tubes reach a cooling tube outer surface seeding temperature before the seeding temperature is reached,
  moving the support relative to the cooling tubes when the cooling tube outer surface seeding temperature and the seeding temperature are met such that the plurality of vials is engaged with the cooling tubes for a predetermined time so as to initiate a seeding process in the cellular samples,
  cooling the cooling chamber to a final temperature, and
  controlled removing latent heat within reaching final temperature.

Thus, the cellular samples may be cryopreserved under defined conditions without having negative impact on the viability of the cellular samples. Particularly, by means of the engagement of the vials with the cooling tubes, a local and timely limited sub-cooling of the cellular samples is provided.

As the cooling chamber is pre-cooled to a temperature hold point before the support is loaded with a plurality of vials, a first cooling step of the vials when loaded into the cooling chamber is accelerated or takes less time because the cooling chamber and the vials do not have to be pre-cooled together. Further, as the temperature within the cooling chamber is held at the temperature hold point, it is ensured that each of the vials has an identical temperature before being further processed and being cooled to the seeding temperature, respectively. Thus, the vials may be cooled to the seeding temperature under moderate conditions in a short time.

The temperature hold point may be from −2° C. to 10° C. According to another embodiment, the temperature hold point may be and preferably from 0° C. to 5° C. such as 4° C.

The seeding temperature may be from a freezing point of the cellular sample to −15° C. The temperature hold point and/or the seeding temperature may be defined as temperatures in the cellular samples.

The cooling tube outer surface seeding temperature may be defined as a temperature on an outer surface of and the cooling tubes which allows to induce the seeding process of the cellular samples. With other words, the temperature on the outer surface of the cooling tubes is determined as a temperature being sufficient low to allow inducing the seeding process of the cellular samples when the vials engage the cooling tubes.

The final temperature may be from −120° C. to −190° C. such as −185° C.

The predetermined time may be from 0.5 minutes to 3.0 minutes. According to another embodiment, the predetermined time may be from 1.5 minutes to 2.5 minutes such as 2.0 minutes. Thus, the seeding process may be initiated within a relative short time.

The precooling time may be from 0.1 minutes to 5.0 minutes. As the cooling tube outer surface seeding temperature is reached within the precooling time, the cooling tube outer surface seeding temperature is reached within a relative short time.

As the plurality of vials may be engaged with the cooling tubes for the predetermined time, seeding occurs in a timely controlled manner.

Particularly, the seeding process may be initiated by means of local engagement of the plurality of vials with the cooling tubes such that crystallization of cellular samples is locally induced.

The refrigerant may be supplied to the cooling tubes until reaching the cooling tube outer surface seeding temperature such that a local crystallization seed is formed at the cellular sample for the predetermined time when the plurality of vials is engaged with the cooling tubes.

With other words, the seeding process may be initiated by means of local engagement of the plurality of vials with the cooling tubes for a predetermined time until reaching the cooling tube outer surface seeding temperature such that crystallization of the cellular samples is enforced by a temporary, local and strong or intensive cold spot in the cellular samples.

The refrigerant may be supplied with the cooling tubes with the cooling tube outer surface seeding temperature such that all of the cellular samples crystallize substantially at the same time.

The cooling tube outer surface seeding temperature may be from −130° C. to −200° C. According to another embodiment, the cooling tube outer surface seeding temperature may be from −140° C. to −190° C. such as −180° C.

The plurality of vials may be moved relative to the support so as to be engaged with the cooling tubes.

The seeding temperature may be close to a freezing temperature of the cellular sample. The term "close to a freezing temperature" as used herein refers to a temperature having a deviation of not more than 4 K below the freezing temperature.

The vials may be disengaged from the cooling tubes when the cooling chamber is cooled to the seeding temperature.

When seeding is induced in the plurality of vials, the vials are disengaged from the cooling tubes.

Subsequently, the cooling tubes are cooled to the final temperature such that latent heat of the cellular samples may be removed.

The latent heat may be removed by means of dissipation. Particularly, the latent heat is removed by controlling velocity and temperature of a gaseous refrigerant flow within the cooling chamber.

The final temperature may be from −120° C. to −190° C. According to another embodiment, the final temperature may be from −125° C. to −190° C. such as −180° C.

Summarizing the findings of the present invention, the following embodiments are preferred:

EMBODIMENT 1

Apparatus for cryopreserving a plurality of cellular samples, comprising
a cooling chamber,
a cooling device comprising means configured to cool an interior of the cooling chamber, wherein the cooling device further comprises cooling tubes that are separate from the means configured to cool the interior of the cooling chamber and that are arranged within the cooling chamber, wherein the cooling device is configured to provide a flow of refrigerant through the cooling tubes, and
a support for supporting a plurality of vials for storing cellular samples, wherein the support is movable relative to the cooling tubes such that the plurality of vials is engageable with the cooling tubes.

EMBODIMENT 2

Apparatus according to embodiment 1, wherein the support is moveable such that the plurality of vials is engageable with the cooling tubes at a predetermined and adjustable height of the vials.

EMBODIMENT 3

Apparatus according embodiment 2, wherein the height corresponds to a liquid surface of the cellular samples.

EMBODIMENT 4

Apparatus according to any one of embodiment 1 to 3, wherein the cooling tubes are arranged parallel to one another.

EMBODIMENT 5

Apparatus according to any one of embodiments 1 to 4, wherein the cooling tubes are evenly spaced apart from one another.

EMBODIMENT 6

Apparatus according to embodiment 4 or 5, wherein the support comprises a plurality of compartments for receiving the plurality of vials, wherein the compartments are arranged such that the plurality of vials are is arrangeable between the cooling tubes.

EMBODIMENT 7

Apparatus according to embodiment 6, wherein the compartments are arranged as lines, which extend parallel to one another.

EMBODIMENT 8

Apparatus according to embodiment 6 or 7, wherein the cooling tubes and the compartments are arranged parallel to one another.

EMBODIMENT 9

Apparatus according to any one of embodiments 6 to 8, wherein the compartments are moveable relative to the support such that each of the plurality of vials is individually engageable with at least one of the cooling tubes.

EMBODIMENT 10

Apparatus according to embodiment 9, wherein the compartments are moveable in the support.

EMBODIMENT 11

Apparatus according to any one of embodiments 6 to 10, wherein the compartments are adapted to fix the plurality of vials.

EMBODIMENT 12

Apparatus according to any one of embodiments 6 to 11, wherein the compartments are formed such that the plurality of vials is directly engageable with the cooling tubes.

EMBODIMENT 13

Apparatus according to any one of embodiments 1 to 12, wherein the support is moveable on rails.

EMBODIMENT 14

Apparatus according to any one of embodiments 1 to 13, wherein the cooling device comprises a ring-shaped tube portion, wherein the cooling tubes are connected to the ring-shaped tube portion.

EMBODIMENT 15

Apparatus according to embodiment 14, wherein the ring-shaped tube portion surrounds the cooling tubes, wherein the cooling tubes comprise ends connected to the ring-shaped tube portion.

EMBODIMENT 16

Apparatus according to embodiments 14 or 15, wherein the ring-shaped tube portion comprises inlets for supplying a refrigerant.

EMBODIMENT 17

Apparatus according to embodiment 16, wherein the ring-shaped tube portion is separated into segments, wherein each segment is associated with at least one of the inlets.

EMBODIMENT 18

Apparatus according to embodiment 17, wherein the ring-shaped tube portion is separated into the segments by means of separating walls.

EMBODIMENT 19

Apparatus according to embodiment 17 or 18, wherein the segments are adapted to allow a substantially identical flow of the refrigerant through the cooling tubes.

EMBODIMENT 20

Apparatus according to any one of embodiments 16 to 19, wherein the inlets are evenly spaced apart from one another.

EMBODIMENT 21

Apparatus according to any one of embodiments 14 to 20, wherein an inner diameter of the ring-shaped tube portion is larger than an inner diameter of the cooling tubes.

EMBODIMENT 22

Apparatus according to any one of embodiments 1 to 21, wherein the cooling device is adapted to provide a sufficient flow of refrigerant through the cooling tubes such that the cooling tubes reach a cooling tube outer surface seeding temperature within a precooling time.

EMBODIMENT 23

Apparatus according to embodiment 22, wherein the cooling device is adapted to provide a refrigerant flow from bottom to top of the cooling tubes until reaching cooling tube outer surface seeding temperature within the precooling time.

EMBODIMENT 24

Apparatus according to any one of embodiments 1 to 23, wherein the cooling chamber is cylindrical.

EMBODIMENT 25

Apparatus according to any one of embodiments 1 to 24, further comprising an inner casing, in which the cooling chamber is located, and an outer casing housing the inner casing.

EMBODIMENT 26

Apparatus according to embodiment 25, wherein the means configured to cool an interior of the cooling chamber is or comprises nozzles for injecting a refrigerant for cooling the interior of the cooling chamber.

EMBODIMENT 27

Apparatus according to embodiment 26, wherein the nozzles are disposed in a space between the inner casing and the outer casing.

EMBODIMENT 28

Apparatus according to embodiment 27, wherein the inner casing comprises a lower side and a top side, wherein the lower side and the top side comprise orifices.

EMBODIMENT 29

Apparatus according to embodiment 28, wherein the lower side and the top side comprise perforated plates, wherein the perforated plates comprise the orifices.

EMBODIMENT 30

Apparatus according to embodiment 29, wherein the perforation plates comprise a perforation ratio of 5% to 15%.

EMBODIMENT 31

Apparatus according to any one of embodiments 28 to 30, further comprising a fan disposed between the top side of the inner casing and the outer casing.

EMBODIMENT 32

Apparatus according to any one of embodiments 27 to 31, wherein the cooling device comprises an inlet, which is located in the space between the inner casing and the outer casing, and distribution tubes connecting the inlet to the nozzles.

EMBODIMENT 32

Apparatus according to embodiment 32, wherein the nozzles are evenly distributed in the space between the inner casing and the outer casing.

EMBODIMENT 34

Apparatus according to claim embodiment 33, wherein the nozzles are located within a common plane.

EMBODIMENT 35

Apparatus according to embodiment 33 or 34, wherein the inlet is located on a central axis of the cooling chamber.

EMBODIMENT 36

Apparatus according to any one of embodiments 25 to 35, further comprising a middle casing arranged between the inner casing and the outer casing, wherein the middle casing comprises an outlet for refrigerant, wherein the outer casing comprises an outlet for refrigerant, wherein the outlet of the middle casing and the outlet of the outer casing are connected to one another.

EMBODIMENT 37

Apparatus according to embodiment 36, wherein the middle casing comprises a lower side and a top side, wherein the outlet of the middle casing is located in the lower side, wherein the outer casing comprises a lower side and a top side, wherein the outlet of the outer casing is located in the top side.

EMBODIMENT 38

Apparatus according to any one of embodiments 1 to 37, wherein the support is adapted to support the plurality of vials in a common plane.

EMBODIMENT 39

Apparatus according to embodiment 38, wherein the cooling chamber is adapted to be arranged such that the common plane is perpendicular to a direction of gravity.

EMBODIMENT 40

Apparatus according to any one of embodiments 1 to 39, wherein the cooling device is adapted to supply the cooling tubes with refrigerant in a liquid state such that a seeding process of the cellular samples in the vials is initiated by means of engagement of the vials with the cooling tubes.

EMBODIMENT 41

Apparatus according to any one of embodiments 1 to 39, wherein the support is adapted to receive at least 100 vials.

EMBODIMENT 42

Apparatus according to any one of embodiments 1 to 41, wherein the support is adapted to receive vials, each of which is adapted to store a cellular sample having a volume of 10 ml to 250 ml.

EMBODIMENT 43

Method for cryopreserving a plurality of cellular samples using an apparatus according to any one of embodiments 1 to 42, comprising the steps:
cooling the cooling chamber to a temperature hold point,
providing cellular samples in a liquid state in a plurality of vials,
loading the support with the plurality of vials,
holding the cooling chamber at the temperature hold point for purpose of temperature synchronization in the plurality of vials,
cooling the cooling chamber to a seeding temperature in the vials,
supplying a refrigerant through the cooling tubes for a precooling time such that the cooling tubes reach a cooling tube outer surface seeding temperature before the seeding temperature is reached,
moving the support relative to the cooling tubes when the cooling tube outer surface seeding temperature and the seeding temperature are met such that the plurality of vials is engaged with the cooling tubes for a predetermined time so as to initiate a seeding process in the cellular samples,
cooling the cooling chamber to a final temperature, and controlled removing latent heat within reaching final temperature.

EMBODIMENT 44

Method according to embodiment 43, wherein the seeding process is initiated by means of local engagement of the plurality of vials with the cooling tubes for a predetermined time such that crystallization of the cellular samples is locally induced.

EMBODIMENT 45

Method according to embodiment 43 or 44, wherein the refrigerant is supplied through the cooling tubes until reaching the cooling tube outer surface seeding temperature such that a local crystallization seed is formed at the cellular sample for the predetermined time when the plurality of vials is engaged with the cooling tubes.

EMBODIMENT 46

Method according to any one of embodiments 43 to 45, wherein the seeding temperature and/or the final temperature are defined as temperatures in the cellular samples.

EMBODIMENT 47

Method according to any one of embodiments 43 to 46, wherein the predetermined time is from 0.5 minutes to 3.0 minutes, particularly from 1.5 minutes to 2.5 minutes, wherein the precooling time is from 0.1 minutes to 5.0 minutes.

EMBODIMENT 48

Method according to any one of embodiments 43 to 47, wherein the refrigerant is supplied through the cooling tubes with the cooling tube outer surface seeding temperature such that all of the cellular samples crystallize substantially at the same time.

EMBODIMENT 49

Method according to any one of embodiments 43 or 48, wherein the seeding process is initiated by means of local engagement of the plurality of vials with the cooling tubes such that crystallization of the cellular samples is locally induced.

EMBODIMENT 50

Method according to any one of embodiments 43 to 49, wherein the temperature hold point is from −2° C. to 10° C. and particularly from 0° C. to 5° C., wherein the seeding temperature is from a freezing point of the cellular samples to −15° C., wherein the final temperature is from −120° C. to −190° C., wherein the cooling tube outer surface seeding temperature is from −130° C. to −200° C. and particularly from −140° C. to −190° C.

EMBODIMENT 51

Method according to any one of embodiments 43 to 50, wherein the cooling tube outer surface seeding temperature is determined such that the refrigerant is in a liquid state after being supplied through the cooling tubes.

EMBODIMENT 52

Method according to any one of embodiments 43 to 51, wherein the plurality of vials is moved relative to the support so as to be engaged with the cooling tubes.

EMBODIMENT 53

Method according to any one of embodiments 43 to 52, wherein the vials are disengaged from the cooling tubes when seeding is induced in the plurality of vials.

EMBODIMENT 54

Method according to any one of embodiments 43 to 53, wherein the latent heat is removed by means of dissipation.

EMBODIMENT 55

Method according to any one of embodiments 43 to 54, wherein the latent heat is removed by controlling velocity and temperature of a gaseous refrigerant flow within the cooling chamber.

SHORT DESCRIPTION OF THE FIGURES

Further features and embodiments of the invention will be disclosed in more detail in the subsequent description of embodiments, particularly in conjunction with the dependent claims. Therein, the respective features may be realized in an isolated fashion as well as in any arbitrary feasible combination, as the skilled person will realize. The scope of the invention is not restricted by the embodiments. The embodiments are schematically depicted in the figures. Therein, identical reference numbers in these figures refer to identical or functionally comparable elements.

DETAILED DESCRIPTION OF THE EMBODIMENTS

Figure 1:
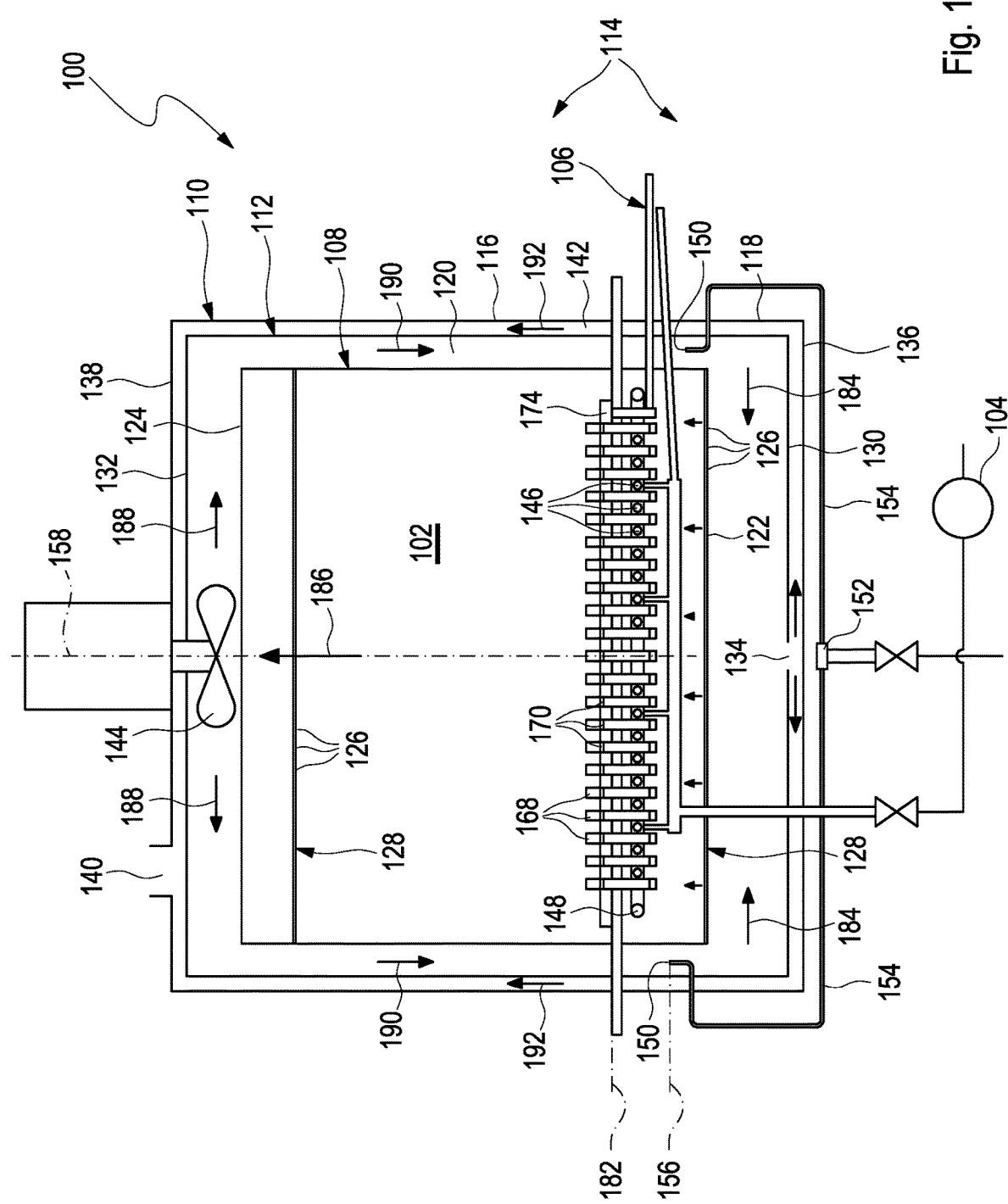
FIG. 1 shows an apparatus for cryopreserving a plurality of cellular samples.

FIG. 1 shows an apparatus for cryopreserving a plurality of cellular samples. The apparatus 100 comprises a cooling chamber 102, a cooling device 104 and a support 106. The cooling chamber 102 is cylindrical. Particularly, the cooling chamber 102 is circular cylindrical. The apparatus 100 further comprises an inner casing 108, in which the cooling chamber 102 is located, or which defines the cooling chamber 102, an outer casing 110 housing the inner casing 108, and a middle casing 112 arranged between the inner casing 108 and the outer casing 110. The inner casing 108, the outer casing 110 and the middle casing 112 may be configured to form a modular casing assembly 114 comprising an upper part 116 and a lower part 118. With other words, each of the inner casing 108, the outer casing 110 and the middle casing 112 is separated into two parts forming the upper part 116 and the lower part 118 as will be explained in more detail below. The upper part 116 is arranged on the top of the lower part 118. The outer casing 110 houses the inner casing 108 such that a space 120 is formed between the inner casing 108 and the outer casing 110. More particularly, the space 120 is formed between the inner casing 108 and the middle casing 112.

The inner casing 108 comprises a lower side 122 and a top side 124. The lower side 122 and the top side 124 comprise orifices 126. More particularly, the lower side 122 and the top side 124 comprise perforated plates 128. The perforated plates 128 comprise the orifices 126. Needless to say, the lower side 122 and the top side 124 may be designed as perforated plates 128. The perforated plates 128 comprise a perforation ratio of 5% to 15% such as 10%. The perforation ratio may vary over the plate radius. Further, the perforation ratio of the perforated plate 128 at the lower side 122 may be different from the perforation ratio of the perforated plate 128 at the top side 124. The orifices 126 may comprise circular cross-sectional areas. By means of the orifices 126, the space 120 is in fluid communication with the cooling chamber 102. The middle casing 112 comprises a lower side 130 and a top side 132. The middle casing further comprises an outlet 134. The outlet 134 of the middle casing 112 is located in the lower side 130. The outer casing 110 comprises a lower side 136 and a top side 138. The outer casing 110 further comprises an outlet 140. The outlet 140 of the outer casing 110 is located in the top side 138. The outlet 134 of the middle casing 112 and the outlet 140 of the outer casing 110 are connected to one another. For example, the outlets 134, 140 are connected to one another by means of a channel 142, space or the like formed between the outer casing 110 and the middle casing 112. The apparatus 100 further comprises a fan 144. The fan 144 is disposed between the top side 124 of the inner casing 108 and the outer casing 110.

Figure 2:
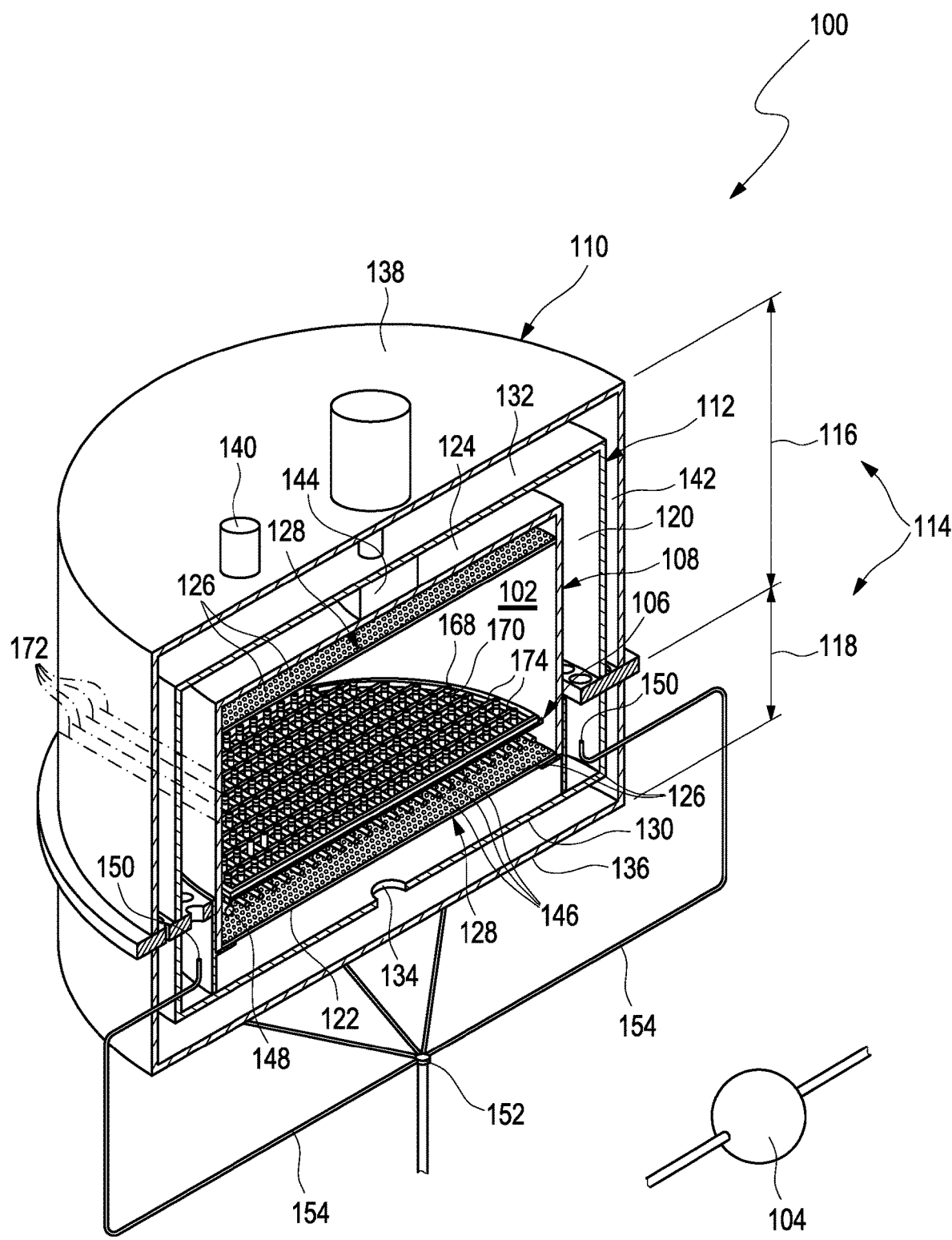
FIG. 2 shows a cross-sectional view of the apparatus.

FIG. 2 shows a cross-sectional view of the apparatus 100. The cooling device 104 is adapted to cool an interior of the cooling chamber 102. For this reason, the cooling device 104 comprises means configured to cool an interior of the cooling chamber 102 as will be explained in further detail below. The cooling device 104 further comprises cooling tubes 146 that are separate from the means configured to cool the interior of the cooling chamber 102. The cooling tubes 146 are arranged within the cooling chamber 102. The cooling device 104 is configured to provide a flow of refrigerant through the cooling tubes 146. The cooling tubes 146 are arranged parallel to one another. Further, the cooling tubes 146 are evenly spaced apart from one another. The cooling device 104 further comprises a ring-shaped tube portion 148. The cooling tubes 146 are connected to the ring-shaped tube portion 148. Particularly, the ring-shaped tube portion 148 surrounds the cooling tubes 146. The cooling device 104 further comprises nozzles 150 for injecting a refrigerant into the cooling chamber so as to cool the interior of the cooling chamber 102. Thus, the nozzles 150 serve as means to cool the interior of the cooling chamber 102. The nozzles 150 are disposed in the space 120 between the inner casing 108 and the outer casing 110. The cooling device 104 further comprises an inlet 152, which is located outside the casing assembly 114, and distribution tubes 154 connecting the inlet 152 to the nozzles 150. As shown in FIG. 2, the nozzles 150 are evenly distributed in the space 120 between the inner casing 108 and the outer casing 110. For example, the distribution tubes 154 extend radially outward from the inlet 152 and mainly below the casing assembly 114. For example, the distribution tubes 154 are arranged in a star-shaped manner around the inlet 152. Further, the distribution tubes 154 extend upward laterally outside the casing assembly 114 and extend through the lower part 118 into the space 120 so as to be connected to the nozzles 150. It is to be noted that the lengths of the distribution tubes 154 are identical such that distances from the nozzles 150 to the inlet 152 are identical. Merely as an example, 10 nozzles 150 are shown in FIG. 2 arranged at even angular positions around the inlet 152. Needless to say, more or less than 10 nozzles 150 may be provided such as 8, 12, 20 depending on the respective geometry of the apparatus 100. The nozzles 150 are located within a common plane 156. The inlet 152 is located on a central axis 158 of the cooling chamber 102. The central axis 158 corresponds to a cylinder axis of the cylindrically shaped cooling chamber 102.

Figure 3:
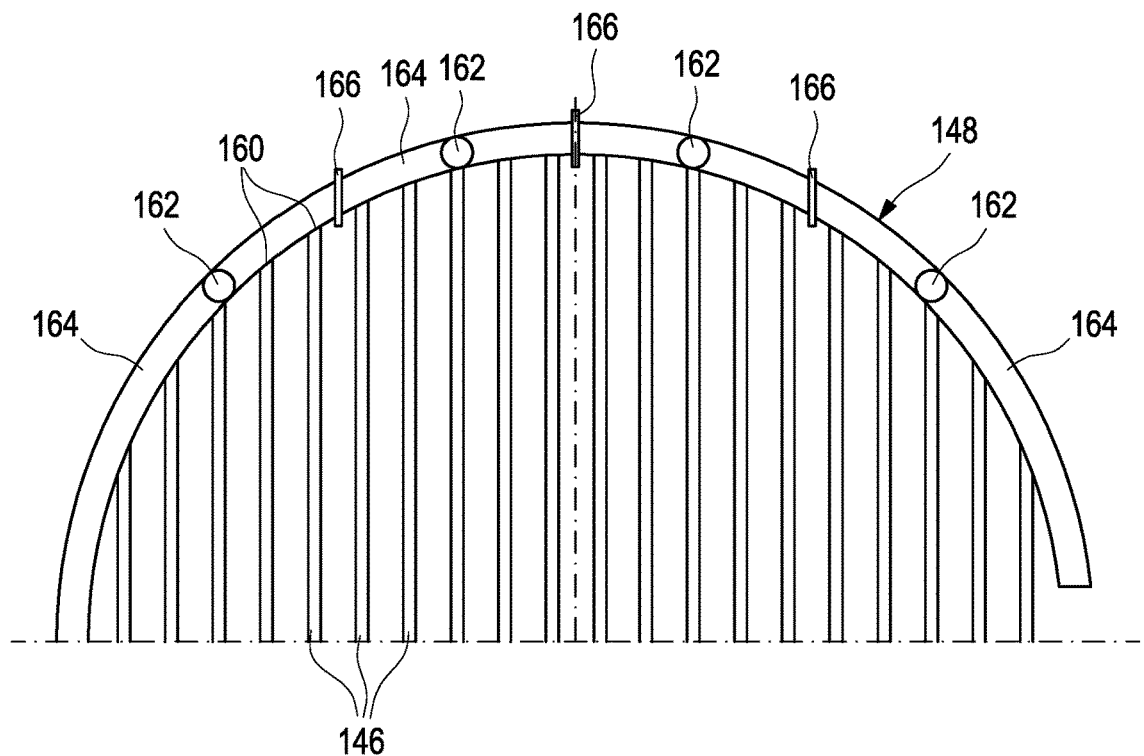
FIG. 3 shows a plain view of the cooling tubes.

FIG. 3 shows a plain view of a part of the cooling device 104. Particularly, FIG. 3 shows the cooling tubes 146 and the ring-shaped tube portion 148. As shown in FIG. 3, the cooling tubes 146 comprise ends 160 connected to the ring-shaped tube portion 148. Further, the ring-shaped tube portion 148 comprises inlets 162 for supplying a refrigerant into the ring-shaped tube portion 148. The ring-shaped tube portion 148 is separated into segments 164. Each segment 164 is associated with at least one of the inlets 162. Particularly, the ring-shaped tube portion 148 is separated into the segments 164 by means of separating walls 166. The segments 164 are adapted to allow a substantially sufficient flow of the refrigerant through the cooling tubes 146. The inlets 162 are evenly spaced apart from one another. Further, an inner diameter of the ring-shaped tube portion 148 is larger than an inner diameter of the cooling tubes 146. With this construction, the cooling device 104 is adapted to provide a refrigerant flow from a bottom to top as will be explained in further detail below. Particularly, FIG. 3 shows 20 cooling tubes 146 and four segments 164 separated from one another by means of three separating walls 166. By means of these segments 164, the refrigerant evenly distributes through the cooling tubes 146. More particularly, the segments 164 shown at the left and right sides with respect to the illustration of FIG. 3 supply five cooling tubes 146 with refrigerant while the inner segments 164 supply four cooling tubes with refrigerant.

As shown in FIGS. 1 and 2, the support 106 is adapted to support a plurality of vials 168 for storing cellular samples. The support 106 comprises a plurality of compartments 170 for receiving the plurality of vials 168. For example, the support 106 comprises 100, 200 or even more compartments 170 for receiving 100, 200 or even more vials 168. With other words, each compartment 170 is adapted to receive one vial 168. The compartments 170 are arranged such that the plurality of vials 168 is arrangeable between the cooling tubes 146. As shown in FIGS. 1 and 2, the compartments 170 are arranged as lines 172, which extend parallel to one another. Further, the cooling tubes 146 and the compartments 170 are arranged parallel to one another. Further, the compartments 170 are movable relative to the support 106. Particularly, the compartments 170 are movable in the support 106 as will be described in further detail below. The compartments 170 are adapted to fix the plurality of vials 168. For example, the compartments 170 comprise elastic clamps or the like which are configured to securely hold the vials 168 in their position.

Figure 4:
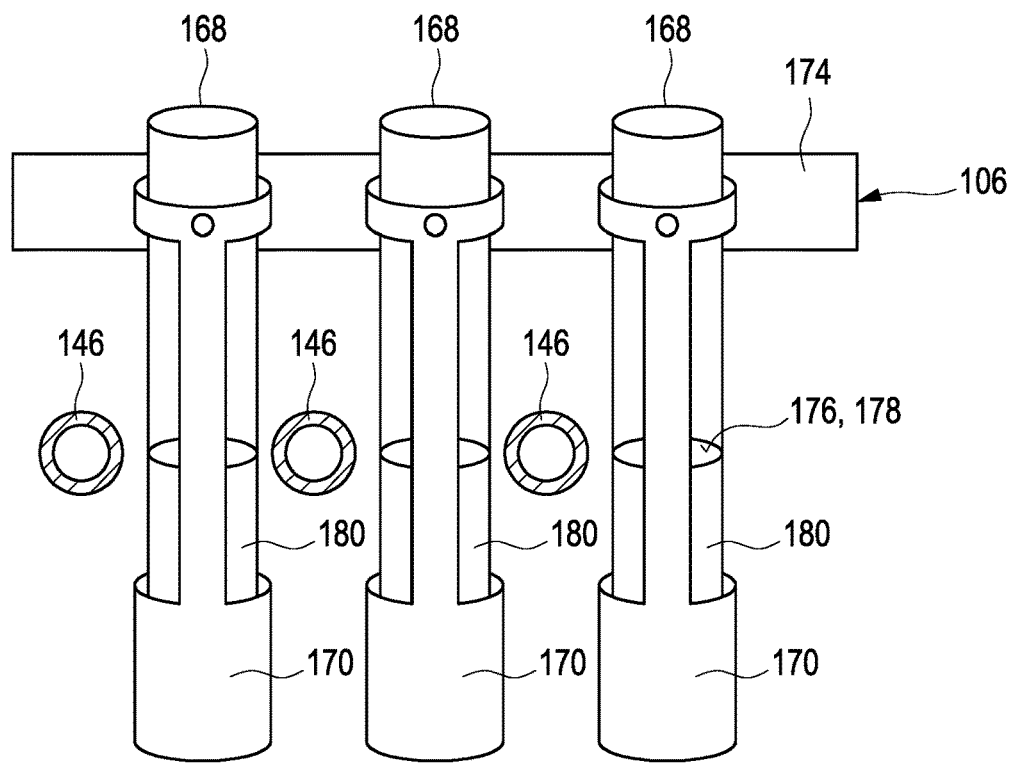
FIG. 4 shows an operation of the support.
Figure 5:
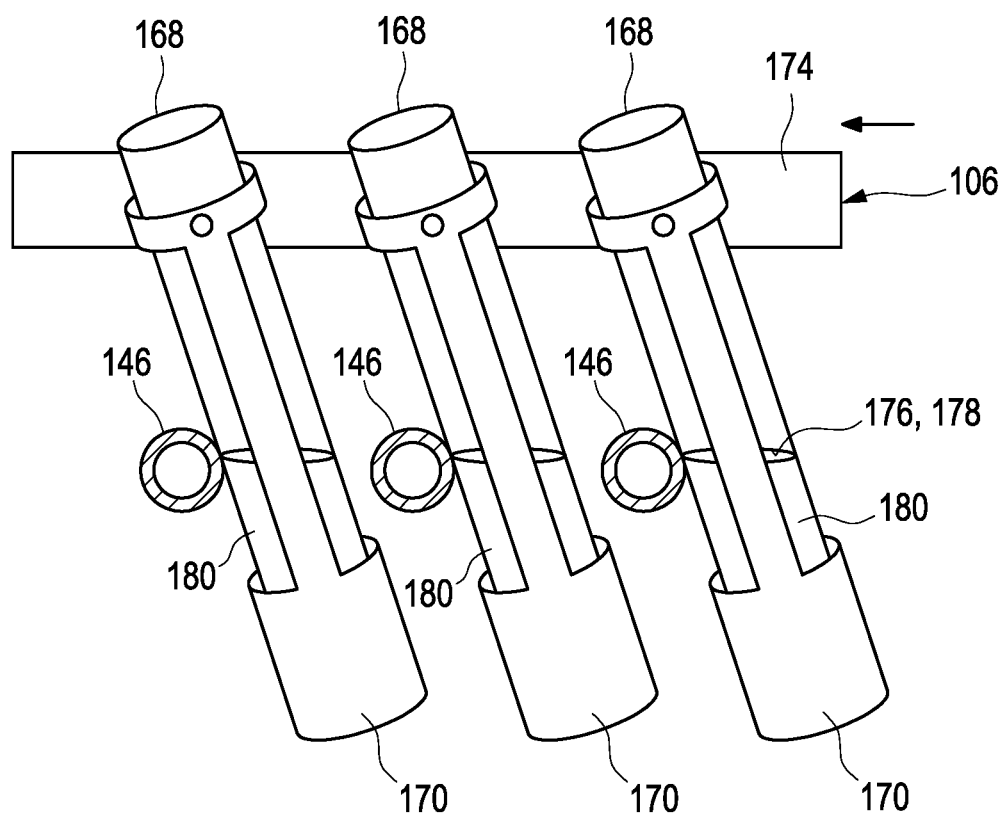
FIG. 5 shows the further operation of the support.

FIG. 4 shows the support 106 in a first operation state and FIG. 5 shows the support 106 in a second operation state. As shown in FIGS. 4 and 5, the support 106 is movable relative to the cooling tubes 146 such that the plurality of vials 168 is engageable with the cooling tubes 146 as shown in FIG. 5. For example, the support 106 may be movable on rails 174. The compartments 170 are formed such that the plurality of vials 168 is directly engageable with the cooling tubes 146. With other words, the compartments 170 are formed such that the cooling tubes 146 may directly engage the vials 168 without any further constructional member between the cooling tubes 146 and the vials 168 during engagement. Particularly, the support 106 is movable such that the plurality of vials 168 is engageable with the cooling tubes 146 at a predetermined height 176 of the vials 168. The height 176 corresponds to a liquid surface 178 of cellular samples 180 stored in the vials 168 and is defined as a position along a longitudinal direction in which the vials 168 extend. The support 106 can be adjusted to change the engagement point in height 176 of a vial 168. The support 106 is adapted to support the plurality of vials 168 in a common plane 182. The cooling chamber 102 is adapted to be arranged such that the common plane 182 is perpendicular to a direction of gravity. The cooling device 104 is adapted to supply the cooling tubes 146 with refrigerant in a liquid state such that a seeding process of the cellular samples and the vials 168 is initiated by means of engagement of the vials with the cooling tubes 146.

Hereinafter, a method for cryopreserving a plurality of cellular samples 180 using the apparatus 100 will be described. Basically, the cellular samples 180 are provided in a liquid state in the plurality of vials 168 at a beginning of the method. The cooling chamber 102 is cooled to a temperature hold point. The temperature hold point is close to, but above the freezing temperature of the cellular samples 180. In order to cool the cooling chamber 102 to the temperature hold point, the cooling device 104 supplies a refrigerant such as liquid nitrogen from the inlet 152 through the distribution pipes 154 to the nozzles 150. The nozzles 150 are configured to spray or inject the refrigerant into the space 120. Further, the fan 144 is operated. The refrigerant discharged from the nozzles 150 flows along the lower side 122 of the inner casing 108 as indicated by arrows 184 in FIG. 1 and may enter the interior of the cooling chamber 102 through the orifices 126 of the perforated plate 128 at the lower side 122 of the inner casing 108.

Then, the support 106 is loaded with the plurality of vials 168. In the interior of the cooling chamber 102, the refrigerant removes heat from the vials 168 and the cellular sample 180 provided in the support 106. Thereby, the refrigerant is heated and flows from the bottom to the top of the cooling chamber 102 caused by convection effects and by being sucked from the fan 144 as indicated by arrow 186. The heated refrigerant leaves the cooling chamber 102 through the orifices 126 of the perforated plate 128 at the top side 124 of the inner casing 108 and enters the space 120 again. The fan 144 blows the heated refrigerant in lateral and downwards directions towards the outlet 134 of the middle casing 112 as indicated by arrows 188, 190. The refrigerant then flows from the outlet 134 of the middle casing 112 to the outlet 140 of the outer casing 110 within the channel 146 as indicated by arrows 192 and is discharged from the outer casing 110 through the outlet 140 thereof. The cooling chamber 102 is held at the temperature hold point so as to allow temperature synchronization in the plurality of vials 168. With other words, the cooling chamber 102 is held at the temperature hold point until all of the vials 168 have the same temperature. The temperature hold point is from 0° C. to 5° C. such as 2° C. Thereafter, the cooling chamber 102 is cooled to a seeding temperature in the vials 168. The cooling chamber 102 is further cooled to the seeding temperature by means of the cooling device 104 which supplies more refrigerant to the nozzles 150 and the interior of the cooling chamber 102. The seeding temperature is from a freezing point of the cellular samples to −15° C. such as −5° C. At the same time, a refrigerant is supplied through the cooling tubes 146 for a precooling time such that the cooling tubes 146 reach a cooling tube outer surface seeding temperature before the seeding temperature is reached. The refrigerant is supplied to the cooling tubes 146 from the ring-shaped tube 148 which in turn is supplied with the refrigerant through the inlets 162. The precooling time is from 0.1 minutes to 5.0 minutes such as 3.0 minutes. The cooling tube outer surface seeding temperature is from −130° C. to −200° C. and particularly from −140° C. to −190° C. such as −150° C. The cooling device provides a refrigerant flow from bottom to top through the cooling tubes 146 until reaching the cooling tube outer surface seeding temperature within the precooling time.

When the cooling tube outer surface seeding temperature and the seeding temperature are met, i.e. the cooling tube outer surface seeding temperature corresponds to the seeding temperature, the support 106 is moved relative to the cooling tubes 146 such that the plurality of vials 168 is engaged with the cooling tubes 146 for a predetermined time so as to initiate a seeding process in the cellular samples 180. Particularly, the support 106 is movable such that the plurality of vials 168 is engageable with the cooling tubes 146 at the predetermined height 176 of the vials 168 corresponding to the liquid surface 178 of cellular samples 180. The predetermined time is from 0.5 minutes to 3.0 minutes, particularly from 1.5 minutes to 2.5 minutes such as 2.0 minutes. The plurality of vials 168 is moved relative to the support 106 so as to be engaged with the cooling tubes 146. More particularly, the compartments 170 in which the vials 168 are provided are moved in the support 106 so as to allow a kind of fine-tuning and to individually engage each of the vials 168 with the cooling tubes 146. The seeding process is initiated by means of local engagement of the plurality of vials 168 with the cooling tubes 146 for the predetermined time such that crystallization of the cellular samples 180 is locally induced. With other words, the seeding process is initiated by means of local engagement of the plurality of vials 168 with the cooling tubes 146 for a predetermined time until reaching the cooling tube outer surface seeding temperature such that crystallization of the cellular samples 180 is enforced by a temporary, local and strong or intensive cold spot in the cellular samples. The refrigerant is supplied through the cooling tubes 146 until reaching the cooling tube outer surface seeding temperature such that a local crystallization seed is formed at the cellular samples 180 for the predetermined time when the plurality of vials 168 is engaged with the cooling tubes 146. Particularly, the refrigerant is supplied through the cooling tubes 146 with the cooling tube outer surface seeding temperature such that all of the cellular samples 180 crystallize substantially at the same time.

When seeding has been induced in the plurality of vials 168, the vials 168 are disengaged from the cooling tubes 146. Further, the cooling chamber 102 is cooled to a final temperature. The final temperature is from −120° C. to −190° C. such as −185° C. Until the final temperature is reached, latent heat is controlled removed from the cellular samples 180. The latent heat is removed by controlling velocity and temperature of a gaseous refrigerant flow within the cooling chamber 102. The gaseous flow of the refrigerant is generated by operation of the fan 144. The latent heat is removed by means of dissipation.

LIST OF REFERENCE NUMBERS 100 apparatus
102 cooling chamber
104 cooling device
106 support
108 inner casing
110 outer casing
112 middle casing
114 casing assembly
116 upper part
118 lower part
120 space
122 lower side
124 top side
126 orifices
128 perforated plates
130 lower side
132 top side
134 outlet
136 lower side
138 top side
140 outlet
142 channel
144 fan
146 cooling tubes
148 ring-shaped tube portion
150 nozzle
152 inlet
154 distribution tubes
156 common plane
158 central axis
160 ends
162 inlets
164 segments
166 separating wall
168 vial
170 compartment
172 line
174 rails
176 height
178 liquid surface
180 cellular sample
182 common plane
184 arrow
186 arrow
188 arrow
190 arrow
192 arrow

The invention claimed is:

1. Apparatus for cryopreserving a plurality of cellular samples, comprising
   a cooling chamber,
   a cooling device comprising means configured to cool an interior of the cooling chamber,
   wherein the cooling device further comprises cooling tubes that are separate from the means configured to cool the interior of the cooling chamber and that are arranged within the cooling chamber, wherein the cooling device is configured to provide a flow of refrigerant through the cooling tubes, and
   a support for supporting a plurality of vials for storing cellular samples,
   wherein the support is movable relative to the cooling tubes such that the plurality of vials is engageable with the cooling tubes.

2. Apparatus according to claim 1, wherein the support is moveable such that the plurality of vials is engageable with the cooling tubes at a predetermined and adjustable height of the vials, wherein the height corresponds to a liquid surface of the cellular samples.

3. Apparatus according to claim 1, wherein the cooling tubes are arranged parallel to one another.

4. Apparatus according to claim 1,
   wherein the support comprises a plurality of compartments for receiving the plurality of vials,
   wherein the cooling tubes and the compartments are arranged parallel to one another,
   wherein the compartments are arranged such that the plurality of vials is arrangeable between the cooling tubes,
   wherein the compartments are moveable relative to the support such that each of the plurality of vials is individually engageable with at least one of the cooling tubes.

5. Apparatus according to claim 1, wherein the cooling device is adapted to provide a sufficient flow of refrigerant through the cooling tubes such that the cooling tubes reach a cooling tube outer surface seeding temperature within a precooling time.

6. Apparatus according to claim 5, wherein the cooling device is adapted to provide a refrigerant flow from bottom to top of the cooling tubes until reaching cooling tube outer surface seeding temperature within the precooling time.

7. Apparatus according to claim 1, further comprising an inner casing, in which the cooling chamber is located, and an outer casing housing the inner casing, wherein the inner casing comprises a lower side and a top side, wherein the lower side and the top side comprise orifices, wherein the lower side and the top side comprise perforated plates, wherein the perforated plates comprise the orifices.

8. Apparatus according to claim 7, wherein the perforation plates comprise a perforation ratio of 5% to 15%.

9. Apparatus according to claim 1, wherein the support is adapted to support the plurality of vials in a common plane.

10. Method for cryopreserving a plurality of cellular samples using an apparatus according to claim 1, comprising the steps:
  cooling the cooling chamber to a temperature hold point,
  providing cellular samples in a liquid state in a plurality of vials,
  loading the support with the plurality of vials,
  holding the cooling chamber at the temperature hold point so as to allow temperature synchronization in the plurality of vials,
  cooling the cooling chamber to a seeding temperature in the vials,
  supplying a refrigerant through the cooling tubes for a precooling time such that the cooling tubes reach a cooling tube outer surface seeding temperature before the seeding temperature is reached,
  moving the support relative to the cooling tubes when the cooling tube outer surface seeding temperature and the seeding temperature are met such that the plurality of vials is engaged with the cooling tubes for a predetermined time so as to initiate a seeding process in the cellular samples,
  cooling the cooling chamber to a final temperature, and controlled removal of latent heat until the final temperature is reached.

11. Method according to claim 10, wherein the seeding process is initiated by means of local engagement of the plurality of vials with the cooling tubes for a predetermined time such that crystallization of the cellular samples is locally induced.

12. Method according to claim 10, wherein the refrigerant is supplied through the cooling tubes until reaching the cooling tube outer surface seeding temperature such that a local crystallization seed is formed at the cellular sample for the predetermined time when the plurality of vials is engaged with the cooling tubes.

13. Method according to claim 10, wherein the predetermined time is from 0.5 minutes to 3.0 minutes, wherein the precooling time is from 0.1 minutes to 5.0 minutes.

14. Method according to claim 10, wherein the refrigerant is supplied through the cooling tubes with the cooling tube outer surface seeding temperature such that all of the cellular samples crystallize substantially at the same time.

15. Method according to claim 10, wherein the seeding temperature is from a freezing point of the cellular samples to −15° C., wherein the final temperature is from −120° C. to −190° C. wherein the cooling tube outer surface seeding temperature is from −130° C. to −200° C.

16. Method according to claim 15, wherein the temperature hold point is from 0° C. to 5° C.

17. Method according to claim 10, wherein the plurality of vials is moved relative to the support so as to be engaged with the cooling tubes.

18. Method according to claim 10, wherein the vials are disengaged from the cooling tubes when seeding is induced in plurality of vials.

19. Method according to claim 10, wherein the latent heat is removed by controlling velocity and temperature of a gaseous refrigerant flow within the cooling chamber.

* * * * *